United States Patent [19]
Laughlin

[11] Patent Number: 5,847,748
[45] Date of Patent: Dec. 8, 1998

[54] MULTIMEDIA PROJECTION SYSTEM

[75] Inventor: David P. Laughlin, Kettering, Ohio

[73] Assignee: NCR Corporation, Dayton, Ohio

[21] Appl. No.: 29,492

[22] Filed: Mar. 11, 1993

[51] Int. Cl.[6] .................................................. B09G 3/36
[52] U.S. Cl. ............................................. 348/1; 348/168
[58] Field of Search ............................. 358/60; 340/711,
340/784; 364/708; 345/1, 2, 7, 30, 156,
168; 348/707, 779, 739, 751; H04N 9/310

[56] References Cited

U.S. PATENT DOCUMENTS

| | | | |
|---|---|---|---|
| 4,149,257 | 4/1979 | Nakagiri | 364/708 |
| 4,371,893 | 2/1983 | Rabeisen | 358/93 |
| 4,517,660 | 5/1985 | Fushimoto | 364/708 |
| 4,755,869 | 7/1988 | Tanaka | 358/60 |
| 4,786,146 | 11/1988 | Ledebuhr . | |
| 4,803,652 | 2/1989 | Maeser | 364/708 |
| 4,825,395 | 4/1989 | Kinser | 364/708 |
| 4,882,617 | 11/1989 | Vriens | 358/60 |
| 5,041,965 | 8/1991 | Chen | 364/200 |
| 5,091,873 | 2/1992 | Araki | 364/708 |
| 5,105,265 | 4/1992 | Sato et al. | 358/60 |
| 5,122,870 | 6/1992 | Takeda et al. | 358/60 |
| 5,160,919 | 11/1992 | Mohler | 340/711 |

FOREIGN PATENT DOCUMENTS

| | | | |
|---|---|---|---|
| 0388976 | 9/1990 | European Pat. Off. . | |
| 0237592 | 9/1989 | Japan | 340/784 |
| 4295880 | 3/1991 | Japan . | |

*Primary Examiner*—Minsun Oh Harvey
*Attorney, Agent, or Firm*—Paul W. Martin

[57] ABSTRACT

A multimedia projection system which includes a notebook computer and an integral projector. The system includes a base portion containing a central processing unit and a user input device, such as a keyboard. The system also includes a lid portion which is removably hinged to the base portion and includes a display and a projector adjacent the display. The lid portion includes a hinge connecting the display and the projector which allows the display to be folded inwardly against the projector when the lid is removed from the base portion. In this configuration, the projector may receive information from the central processing unit through a cable or through a wireless communication circuit. The system may additionally include a sound system and a storage medium containing information to be projected, as well as a camera for capturing projected images and altering further images in real time.

31 Claims, 5 Drawing Sheets

MULTIMEDIA PROJECTION SYSTEM

BACKGROUND OF THE INVENTION

The present invention relates to portable computers and projection devices for presenting information on a screen, and more specifically to a multimedia projection system.

Computer displays are suited for small viewing audiences. The typical display used by most people is the 14-inch display. Such displays are not well suited for large viewing audiences. Projectors which operate in conjunction with computers are available, although such projectors are not portable. Such projectors have a limited bandwidth, which makes them unsuitable for producing large images for large viewing audiences.

Therefore, it would be desirable to provide a computer-based projection system which is both portable and suitable for large audiences.

SUMMARY OF THE INVENTION

In accordance with the teachings of the present invention, a multimedia projection system employing a portable computer with a built-in projector is provided. The system includes a base portion containing a central processing unit and a user input device, such as a keyboard. The system also includes a lid portion which is removably hinged to the base portion and includes a display and a projector adjacent the display. The lid portion includes a hinge connecting the display and the projector which allows the display to be folded inwardly against the projector when the lid is removed from the base portion. In this configuration, the projector may receive information from the central processing unit through a cable or through a wireless communication circuit. The system may additionally include a sound system and a storage medium containing information to be projected, as well as a camera for capturing projected images and altering further images in real time.

It is accordingly an object of the present invention to provide a multimedia projection system employing a portable computer with a built-in projector.

It is another object of the present invention to provide a multimedia projection system employing a portable computer with a built-in projector in which the computer wirelessly communicates with the projector.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
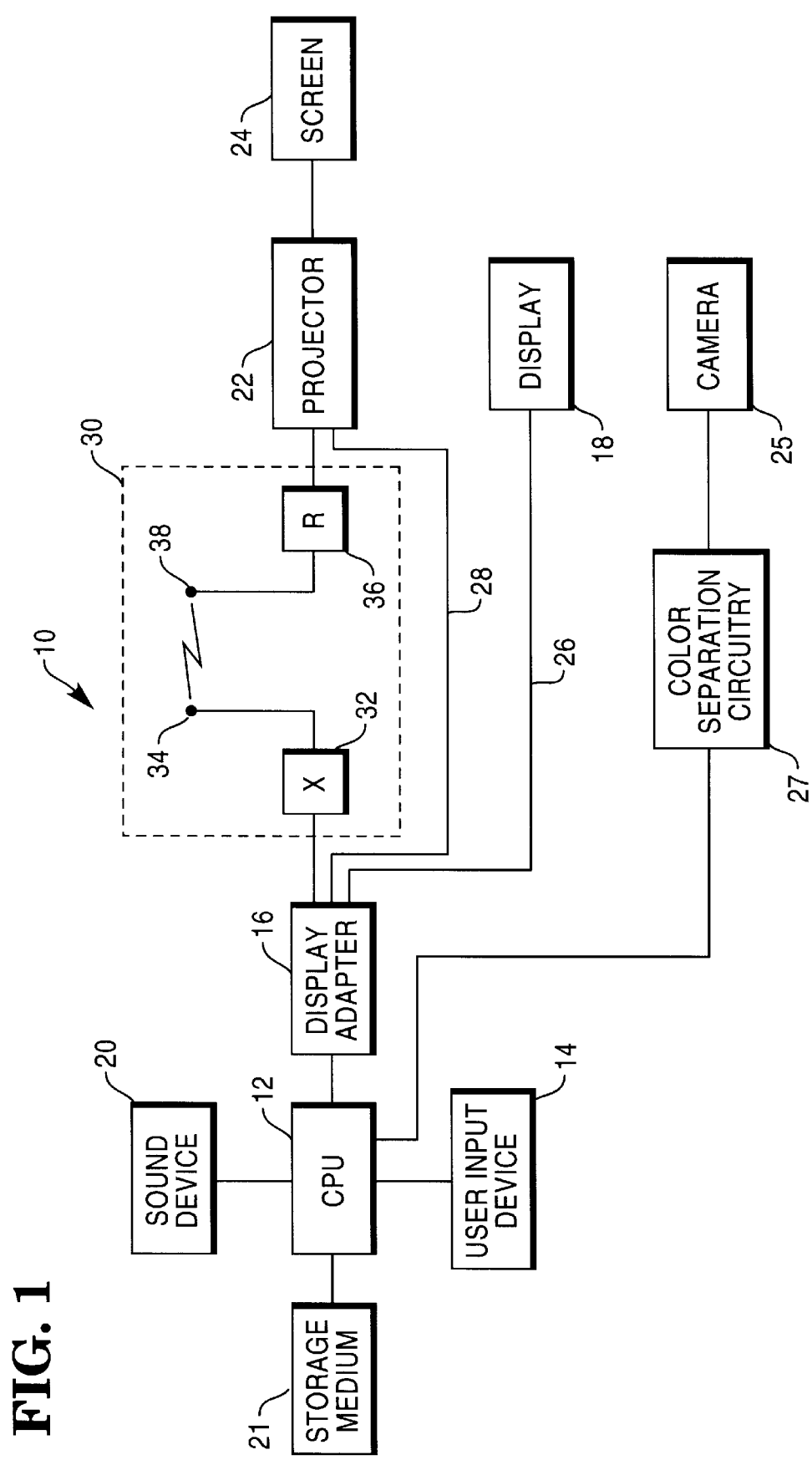
FIG. 1 is a block diagram of the projection system of the present invention.
Figure 2:
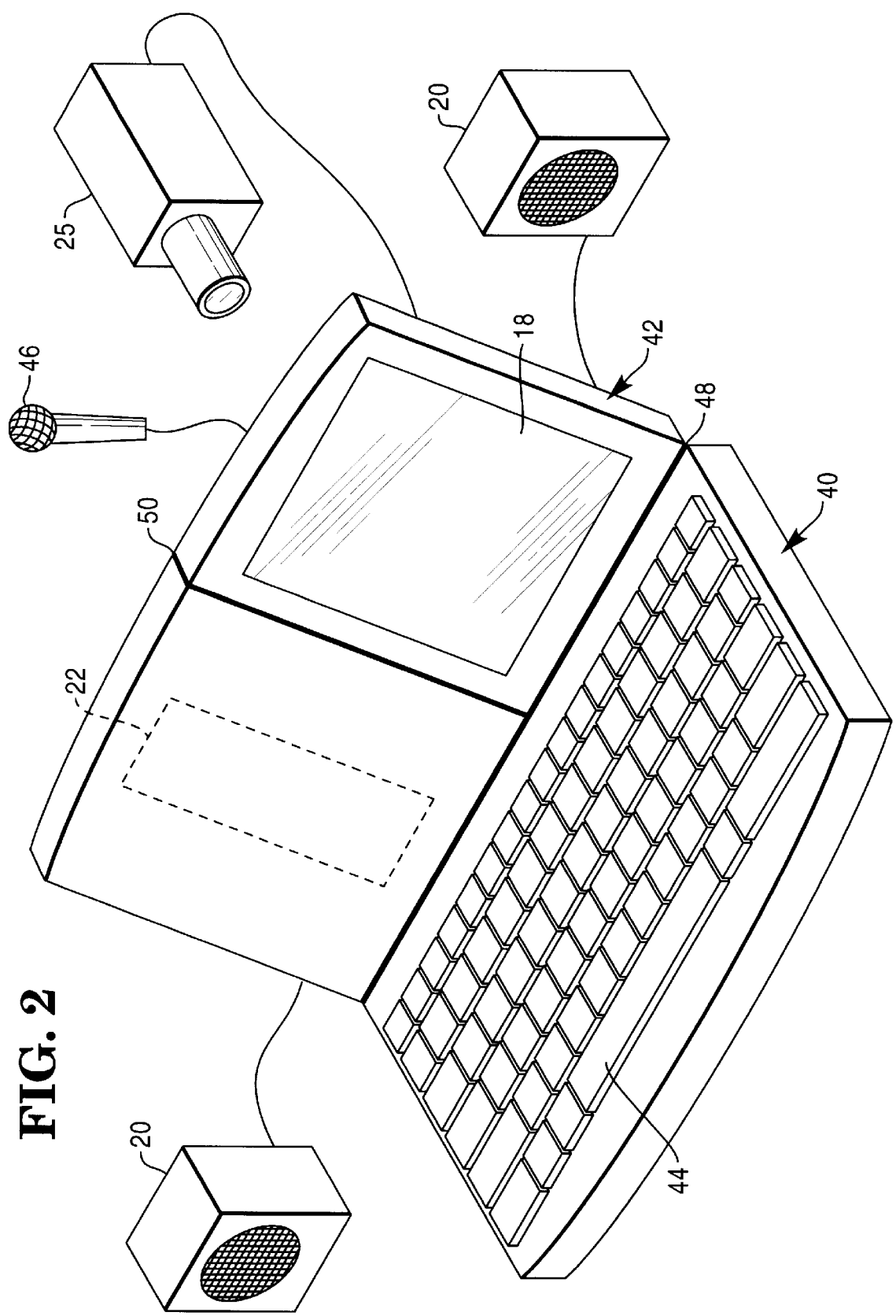
FIG. 2 is a perspective view of the projection system illustrating a display mode of operation.

Referring now to FIG. 1, system 10 of the present invention includes central processing unit (CPU) 12, user input device 14, display adapter 16, display 18, sound device 20, storage device 21, projector 22, and camera 25.

CPU 12, user input device 14, display adapter 16, display 18, and sound device 20 may be found in a typical portable computer. Sound device 20 may be an ordinary speaker or a special sound card and speaker combination, making system 10 particularly suited for multimedia presentations. Storage medium 21 may be a hard disk, a compact disk, or any other memory storage device. User input device 14 may be a keyboard, or a microphone in more sophisticated computers employing speech recognition. Display adapter 16 provides an interface between CPU 12 and display 18.

Projector 22 is used in place of display 18 for the benefit of large audiences. Preferably, projector 22 employs the same adapter 16 as display 18. In addition, projector 22 employs circuitry for driving projector 22. Commands entered through user input device 14 appear on a screen 24 when projector 22 is in use.

CPU 12 communicates with display 18 through cable 26. Communication with projector 22 may be through cable 28 or through wireless circuitry 30. Wireless circuitry 30 may include transmitter 32, transmitter antenna 34, receiver 36, and receiver antenna 38. Other modes of communication are also envisioned, such as infrared communication.

Camera 25 captures images which may be employed to alter projected images in real time. Color separation circuitry 27 separates red, blue, and green signals and digitizes them for processing by CPU 12.

Referring now to FIGS. 2–5, system 10 includes base portion 40 and lid portion 42. Base portion 40 contains CPU 12, keyboard 44, optional microphone 46, display adapter 16, and sound device 20. Lid portion 42 contains display 18 and projector 22.

Lid portion 42 is removably hinged to base portion 40 at hinge 48. When display 18 is in use, lid portion 42 is connected to base portion 40. When projector 22 is in use, lid portion 42 is separated from base portion 40.

Figure 3:
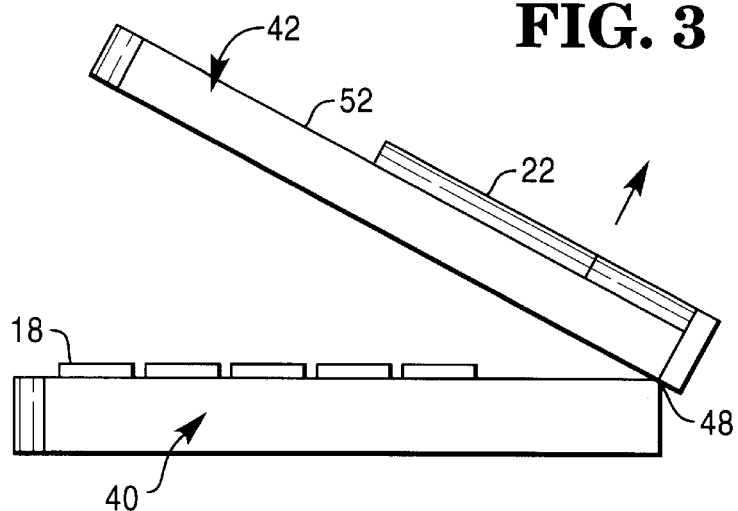
FIG. 3 is a side view of the projection system illustrating disassembly of the projector and display.
Figure 4:
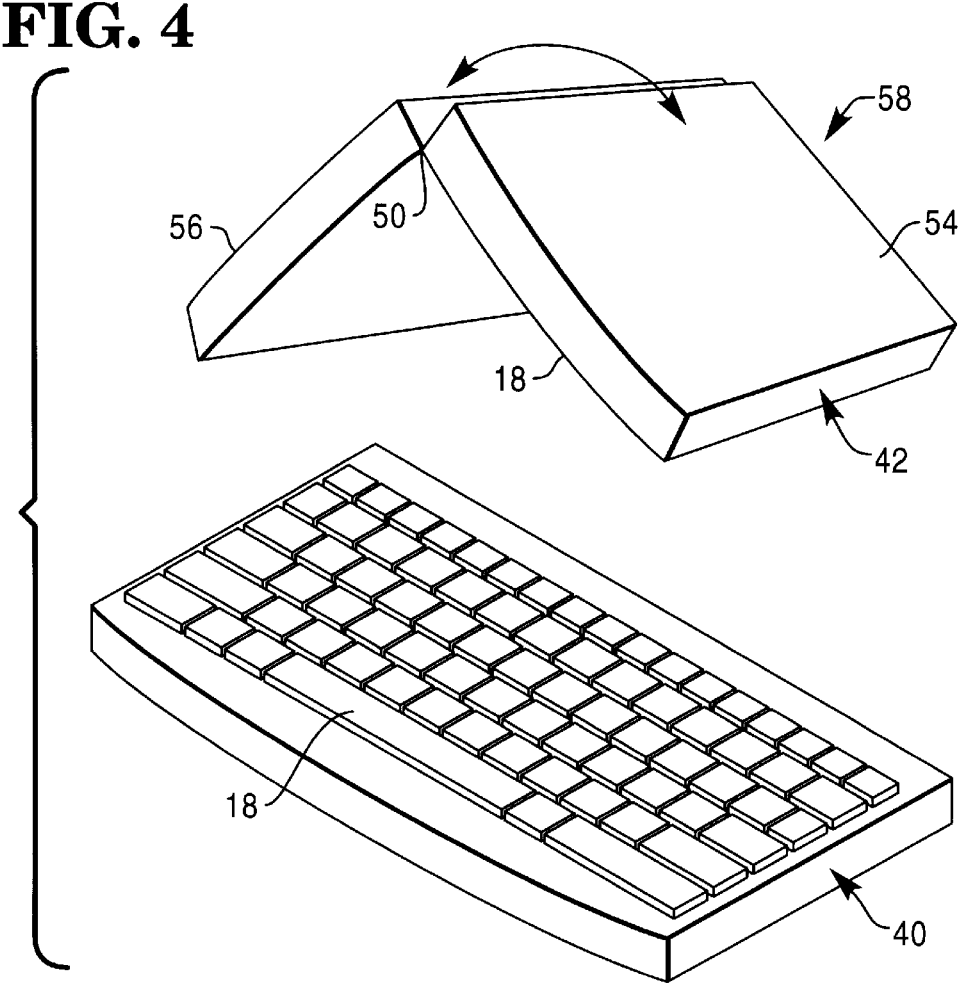
FIG. 4 is a perspective view of the projection system illustrating assembly of the projector-display unit.
Figure 5:
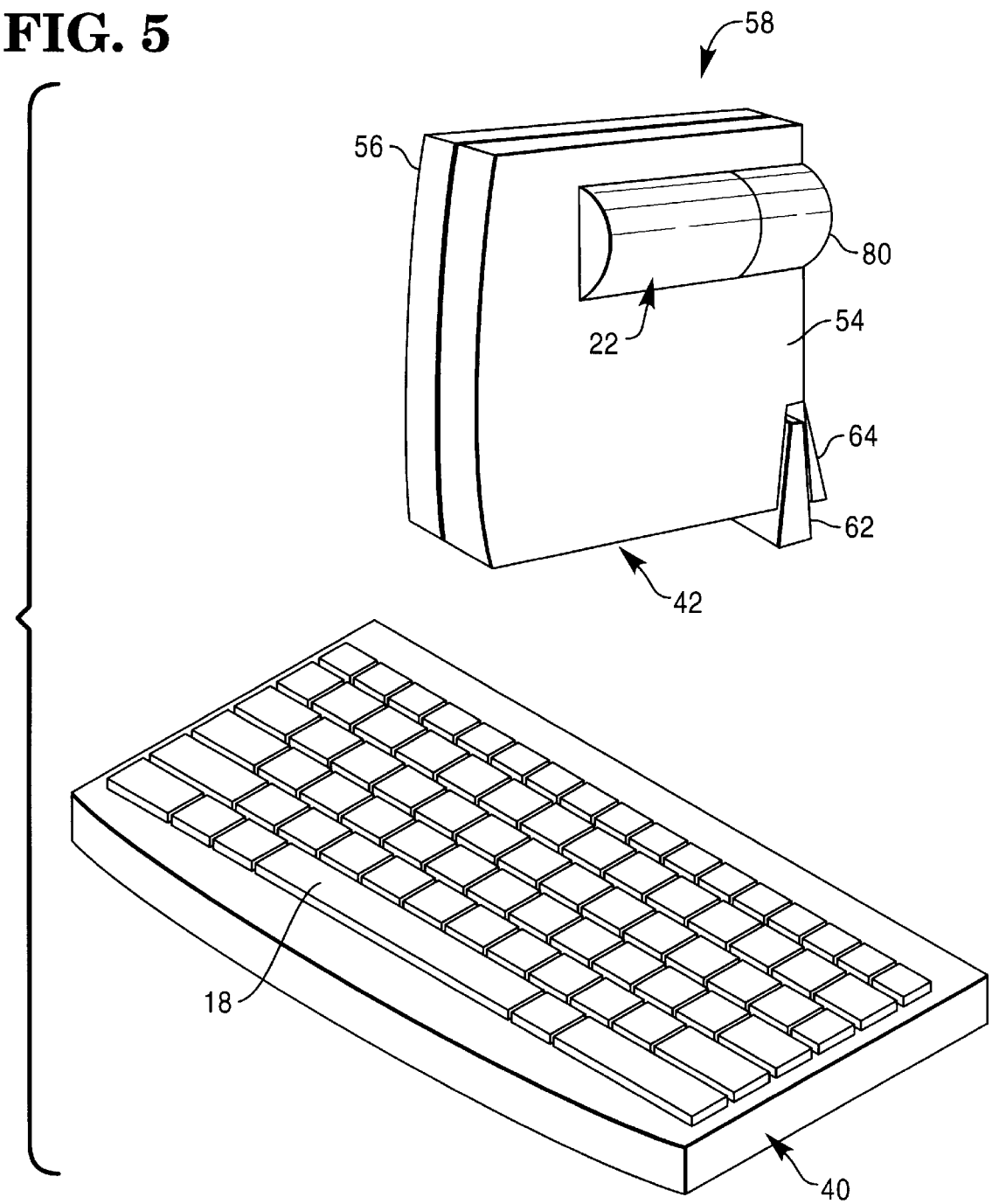
FIG. 5 is a perspective view of the projection system in a projector mode of operation.

FIGS. 3–5 illustrate removal and setup of projector 22. In FIG. 3, lid portion 42 is removed from base portion 40. In FIG. 4, display 18 is folded inward about a second hinge 50. Thus, top surface 52 of lid portion 42 provides an outer protective housing on both sides 54 and 56 of now separated projector-display unit 58. Stand 62 is employed to adjust the projection angle of projector 22. Stand 62 is generally U-shaped and fits within detents 64 on both sides 54 and 56 of projector-display unit 58.

Figure 6:
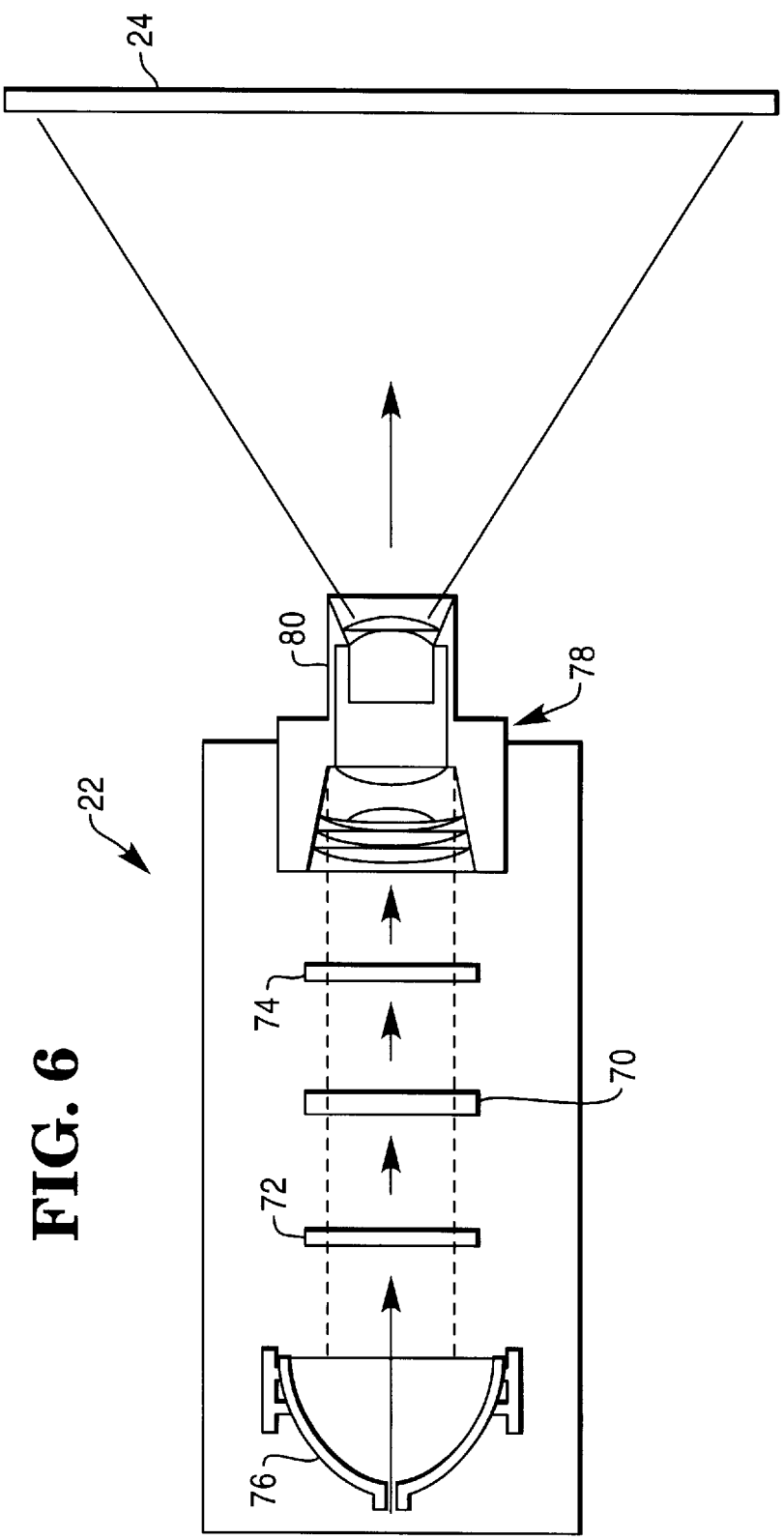
FIG. 6 is a diagrammatic view of the projector.

With reference to FIGS. 5 and 6, projector 22 employs an active matrix liquid crystal panel as a light valve 70 to create the image which is projected on screen 24. A single liquid crystal panel is shown; however, the present invention also envisions the use of three separate panels, each having a red, green, or blue color filter.

Projector 22 also includes polarizers 72 and 74, light source 76, and lens system 78. Polarizer 72 polarizes light from source 76 to establish a reference polarization. Polarizer 74 provides a polarization which is perpendicular to the polarization of polarizer 72. Polarizer 74 allows only light twisted by the liquid crystal material to pass through lens system 78. Polarizers 72 and 74 may be part of or separate from light valve 70. If polymer-dispersed liquid crystal material is used, polarizers 72 and 74 may be eliminated.

Orientation of the material within light valve 70 along the reference polarization produces an "on" condition, which allows all of the light from source 76 to pass through light valve 70. Orientation of the material within light valve 70 perpendicular to the reference polarization produces an "off" condition, which prevents light from source 76 from passing through light valve 70. Shades of grey are produced by circuitry which varies the time of off and on conditions. Such time-varying circuitry may be of analog or digital design. Colors are produced by red, green, and blue filters, which are part of light valve 70.

Light source 76 may be an arc lamp, an incandescent bulb, or any other source of white light. Light source 76 may be powered by alternating or direct current power sources.

Lens system 78 focuses the projected image at screen 24. Lens system 78 preferably includes a focus adjusting mechanism, which includes outer adjusting ring 80.

Although the present invention has been described, with particular reference to certain preferred embodiments thereof, variations and modifications of the present invention can be effected within the spirit and scope of the following claims.

What is claimed is:

1. A system comprising:
   a base portion containing a central processing unit;
   a lid portion containing a display coupled to the central processing unit and a projector for projecting video information from the central processing unit; and
   a hinge connecting the lid portion to the base portion.

2. The system as recited in claim 1, wherein the display and the projector are selectively coupled to the central processing unit.

3. The system as recited in claim 2, further comprising:
   a user input device coupled to the central processing unit.

4. The system as recited in claim 3, wherein the user input device comprises a keyboard within the base portion.

5. The system as recited in claim 3, wherein the user input device comprises a microphone.

6. The system as recited in claim 3, further comprising:
   a sound device including a speaker.

7. The system as recited in claim 1, further comprising:
   an adapter circuit for coupling the central processing unit to the display and the projector.

8. The system as recited in claim 1, further comprising:
   a transmitter coupled to the central processing unit for transmitting information from the central processing unit;
   a first antenna coupled to the transmitter;
   a receiver coupled to the projector for receiving the information from the transmitter; and
   a second antenna coupled to the receiver.

9. The system as recited in claim 1, further comprising:
   a cable for connecting the central processing unit to the projector.

10. The system as recited in claim 1, further comprising:
    a screen separate from the base portion and the lid portion for reflecting images projected by the projector.

11. The system as recited in claim 1, further comprising:
    a storage medium for storing programs and data for recall by the central processing unit.

12. The system as recited in claim 1, wherein the display comprises a liquid crystal display.

13. The system as recited in claim 1, wherein the projector comprises:
    a light source for producing light;
    an active matrix liquid crystal panel, controlled by the central processing unit, and in the path of the light for producing an image; and
    a lens system for focusing the image.

14. The system as recited in claim 1, wherein the lid portion is removable from the base portion.

15. The system as recited in claim 14, further comprising:
    another hinge connecting the display and the projector.

16. The system as recited in claim 15, further comprising:
    a stand for adjusting the elevation of the image from the projector.

17. The system as recited in claim 1, further comprising:
    a camera coupled to the central processing unit for capturing images displayed on the screen and for altering the projected images in real time.

18. A system comprising:
    a base portion containing a central processing unit, a user input device coupled to the central processing unit, a sound device including a speaker coupled to the central processing unit, a video adapter circuit coupled to the central processing unit, a storage medium for storing programs and data for recall by the central processing unit;
    a lid portion containing a liquid crystal display coupled to the central processing unit, and a projector for projecting video information from the central processing unit including a light source for producing light, an active matrix liquid crystal panel controlled by the central processing unit and in the path of the light for producing an image, and a lens system for focusing the image;
    a first hinge removably connecting the lid portion to the base portion;
    a second hinge connecting the display and the projector;
    a transmitter coupled to the central processing unit for transmitting information from the central processing unit;
    a first antenna coupled to the transmitter;
    a receiver coupled to the projector for receiving the information from the transmitter; and
    a second antenna coupled to the receiver.

19. A system comprising:
    a base portion containing a central processing unit, a user input device coupled to the central processing unit, a sound device including a speaker coupled to the central processing unit, a video adapter circuit coupled to the central processing unit, a storage medium for storing programs and data for recall by the central processing unit;
    a lid portion containing a liquid crystal display coupled to the central processing unit, and a projector for projecting images from the central processing unit including a light source for producing light, an active matrix liquid crystal panel controlled by the central processing unit and in the path of the light for producing an image, and a lens system for focusing the image;
    a first hinge removably connecting the lid portion to the base portion;
    a second hinge connecting the display and the projector; and
    a cable for connecting the central processing unit to the projector.

20. A notebook computer comprising:
    a base portion containing a central processing unit and a user input device;
    a lid portion including a display and a projector for projecting images from the central processing unit;
    a first hinge for removably coupling the lid portion to the base portion;

a second hinge connecting the display and the projector so as to allow the display to fold inwardly to a position against the projector; and means for coupling the central processing unit to the projector when the projector and display are removed from the base portion.

21. The system as recited in claim 20, wherein the user input device comprises a keyboard.

22. The system as recited in claim 20, wherein the user input device comprises a microphone.

23. The system as recited in claim 20, further comprising:

a sound device coupled to the central processing unit including a speaker.

24. The system as recited in claim 20, further comprising:

an adapter circuit for selectively coupling the central processing unit to the display and the projector.

25. The system as recited in claim 20, wherein the coupling means comprises:

a transmitter coupled to the central processing unit for transmitting information from the central processing unit;

a first antenna coupled to the transmitter;

a receiver coupled to the projector for receiving the information from the transmitter; and a second antenna coupled to the receiver.

26. The system as recited in claim 20, wherein the coupling means comprises a cable connecting the central processing unit and the projector.

27. The system as recited in claim 20, further comprising:

a screen separate from the base portion and the lid portion for reflecting images projected by the projector.

28. The system as recited in claim 20, further comprising:

a storage medium for storing programs and data for recall by the central processing unit.

29. The system as recited in claim 20, wherein the projector comprises:

a light source for producing light;

an active matrix liquid crystal panel, controlled by the central processing unit, and in the path of the light for producing an image; and a lens system for focusing the image.

30. The system as recited in claim 20, further comprising:

a stand for adjusting the elevation of the image from the projector.

31. A removable lid for a notebook computer comprising:

a display portion including a display for use with the notebook computer when the lid is connected to the computer;

a projector portion adjacent the display portion including a projector for projecting images from the central processing unit;

a hinge connecting the display portion and the projector portion so as to allow the display portion to fold inwardly to a position against the projector portion before operation of the projector; and means for communicating information to be projected from the central processing unit to the projector when the lid is disconnected from the computer.

* * * * *